E. T. WALKER & E. G. BUSSE.
ADJUSTABLE BRAKE HEAD.
APPLICATION FILED DEC. 16, 1911.
1,031,303.
Patented July 2, 1912.
2 SHEETS—SHEET 1.
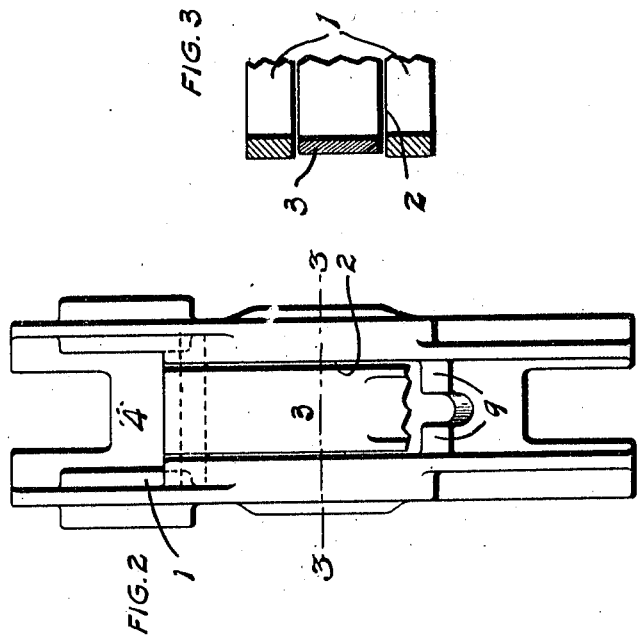
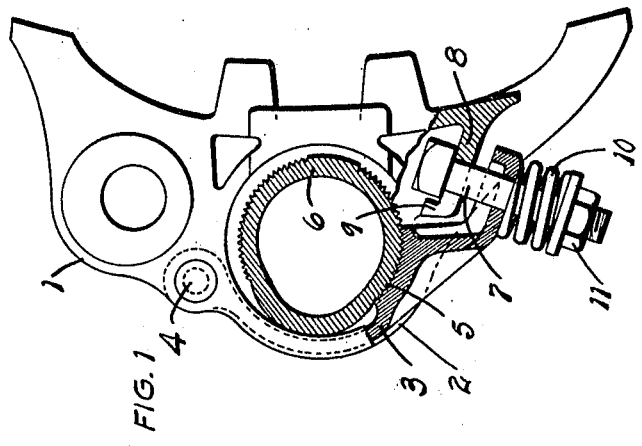
WITNESSES
Wm. Jannus.
J. H. Bishop.
INVENTORS
EDWARD T. WALKER
EDWIN G. BUSSE
BY F. R. Cornwall, ATT'Y.

E. T. WALKER & E. G. BUSSE.
ADJUSTABLE BRAKE HEAD.
APPLICATION FILED DEC. 16, 1911.
1,031,303.
Patented July 2, 1912.
2 SHEETS—SHEET 2.
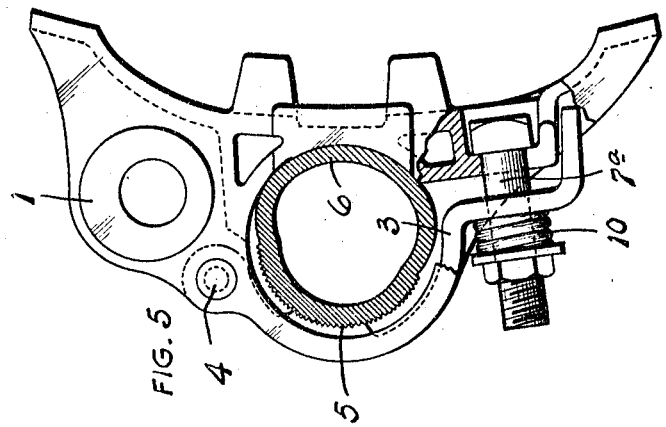
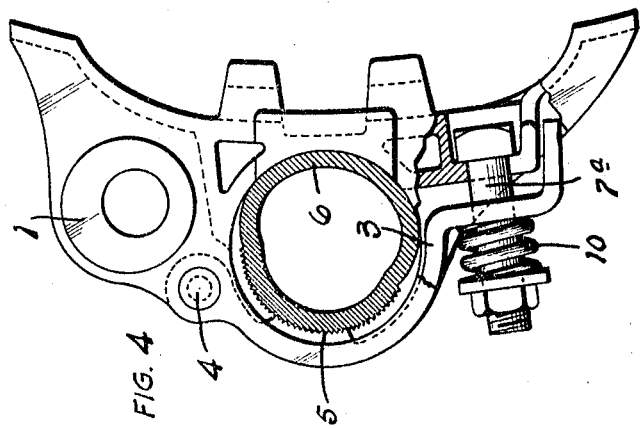
WITNESSES
Wm. Janus.
L. A. Bishop
INVENTORS
EDWARD T. WALKER
EDWIN G. BUSSE
BY F. C. Cornwell ATT'Y.

UNITED STATES PATENT OFFICE.

EDWARD T. WALKER AND EDWIN G. BUSSE, OF CHICAGO, ILLINOIS, ASSIGNORS TO CHICAGO RAILWAY EQUIPMENT COMPANY, OF CHICAGO, ILLINOIS, A CORPORATION OF ILLINOIS.

ADJUSTABLE BRAKE-HEAD.

1,031,303.

Specification of Letters Patent.

Patented July 2, 1912.

Application filed December 16, 1911. Serial No. 666,156.

*To all whom it may concern:*

Be it known that we, EDWARD T. WALKER and EDWIN G. BUSSE, citizens of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is a side elevational view partly in section of our improved adjustable brake head. Fig. 2 is an end elevational view of the same partly broken away. Fig. 3 is a detailed sectional view taken on line 3—3, Fig. 2. Fig. 4 is a side elevational view partly in section of a modified form. Fig. 5 is a similar view showing the nut turned down so that the coils of the spring are solid.

This invention relates to a new and useful improvement in adjustable brake heads designed for use in connection with brake beams, the object being to construct a brake head of the character described, which is simple and cheap and one which will permit the head to adjust itself to the wheel when the brakes are applied, said head automatically locking itself in such adjusted position.

In the drawings: 1 indicates the brake head proper, the rear wall of which is provided with a circumferential slot, as shown in Fig. 2. In this slot is a strap member 3 pivoted at 4 between the flanges to the brake head and whose inner wall is provided with serrations as at 5 to coöperate with serrations on the sleeve member 6, the latter being of well known construction. The lower end of this strap member 3 is appropriately shaped to receive a locking bolt 7, the head of which is seated against a wall 8 in the brake head, said wall being slotted and provided with lugs 9 at the outer end of the slot to prevent the displacement of the bolt head when the same is in operative position.

10 indicates a spring surrounding the bolt which is compressed by a nut 11 on the outer end of the bolt. When this nut is turned, the spring may be placed under variable compression, or if desired, to clamp the strap member 3 rigidly against the sleeve, so as to thereby lock the head in position, the nut 11 may be screwed down until the coils of the spring 10 are solid against each other.

In Figs. 4 and 5 we have shown a modified form of our invention in which the strap is provided with a downwardly extending lug and the bolt 7ª has its head seated in a pocket on the inner face of the head instead of within the head as shown in Fig. 1. In operation, the construction here shown is substantially the same as that before described. Fig. 4 shows the strap yieldingly held in position, and Fig. 5 shows the nut turned down to a point where the coils of the springs are solid upon themselves.

From the above it will be seen that in the construction shown in Fig. 1 the bolts may be inserted and removed from the rear of the brake head, which is of advantage in repairing the parts, as it is not necessary to remove the brake shoe to enable the making of such repairs.

What we claim is:

1. A brake head having a circumferential opening in its rear wall, a strap pivotally mounted at one end of said opening and spanning the same, said strap having means for coöperating with the part of the brake beam on which the head is mounted, and a bolt seated in a recess in the back of the brake head, said bolt passing through the free end of said strap.

2. A brake head having a circumferential opening in its rear wall, a strap pivotally mounted at one end of said opening and spanning the same, said strap having means for coöperating with the part of the brake beam on which the head is mounted, a bolt seated in a recess in the back of the brake head, said bolt passing through the free end of said strap, a spring surrounding said bolt, and the nut on the bolt for compressing the spring.

In testimony whereof we hereunto affix our signatures in the presence of two witnesses, this 16th day of November, 1911.

EDWARD T. WALKER.
EDWIN G. BUSSE.

Witnesses:
E. A. LE BEAU,
M. F. HUNTOON.